(12) United States Patent
Abu-Isa

(10) Patent No.: US 6,809,129 B2
(45) Date of Patent: Oct. 26, 2004

(54) ELASTOMERIC INTUMESCENT MATERIAL

(75) Inventor: Ismat A. Abu-Isa, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 244 days.

(21) Appl. No.: 10/055,112

(22) Filed: Jan. 23, 2002

(65) Prior Publication Data

US 2003/0139492 A1 Jul. 24, 2003

(51) Int. Cl.$^7$ ............................ C09K 21/14; C08K 5/06
(52) U.S. Cl. .................. 523/179; 524/377; 524/378; 524/415; 524/416; 524/436; 524/437; 428/500
(58) Field of Search ..................... 523/179; 524/377, 524/378, 415, 416, 436, 437; 428/500

(56) References Cited

U.S. PATENT DOCUMENTS

| | | | |
|---|---|---|---|
| 4,101,510 A | 7/1978 | Spanswick | 260/45.75 |
| 4,413,822 A | 11/1983 | Fernandez et al. | 273/73 |
| 4,459,339 A | 7/1984 | Libit | 428/514 |
| 4,509,559 A | 4/1985 | Cheetham et al. | 138/121 |
| 4,588,523 A | 5/1986 | Tashlick et al. | 252/606 |
| 4,945,015 A | 7/1990 | Milner et al. | 523/179 |
| 5,232,737 A | 8/1993 | Ghorashi et al. | 427/120 |
| 5,286,775 A | 2/1994 | Bandyopadhyay | 524/416 |
| 5,346,763 A | 9/1994 | Balloni et al. | 428/349 |
| 5,352,430 A | 10/1994 | McCulfor et al. | 423/448 |
| 5,525,651 A | 6/1996 | Ogoe et al. | 523/436 |
| 5,552,198 A | 9/1996 | Hiltner et al. | 428/35.7 |
| 5,618,881 A | 4/1997 | Hojabr | 525/64 |
| 5,780,129 A | 7/1998 | Ohta | 428/35.7 |
| 5,789,470 A | 8/1998 | Herbst et al. | 524/100 |
| 5,804,623 A | 9/1998 | Hoffmann et al. | 524/101 |
| 5,834,535 A | 11/1998 | Abu-Isa et al. | 523/179 |
| 5,934,333 A | 8/1999 | Munzenberger et al. | |
| 5,942,330 A | 8/1999 | Kelley | 428/423.1 |
| 6,043,306 A | 3/2000 | Imahashi | 524/436 |
| 6,153,668 A | 11/2000 | Gestner et al. | 523/179 |
| 6,184,269 B1 | 2/2001 | Abu-Isa et al. | 523/179 |
| 6,238,594 B1 | 5/2001 | Turpin et al. | 252/389.2 |
| 6,410,137 B1 | 6/2002 | Bunyan | 428/356 |
| 6,591,497 B2 | 7/2003 | Foster et al. | |

FOREIGN PATENT DOCUMENTS

| | | |
|---|---|---|
| EP | 0761755 A1 | 3/1997 |
| EP | 0761755 B1 | 4/1999 |
| GB | 874762 | 8/1961 |
| GB | 1497118 | 1/1978 |
| WO | WO 99/38933 | 8/1999 |

OTHER PUBLICATIONS

"Thermo–Oxidative Degradation of Polyethylene. IV Blends Containing Poly(Vinyl Chloride) and Chlorinated Polyethylene as Models for Polyethylene Recycle Qualities", Holmstrom, et al., Polymer Engineering and Science, Sep., 1997, vol. 17, No. 9, pp. 700–705.

"Tyrin Resins For Versatility, Function and Performance", DuPont Dow Elastomers, pp. 1–28, 1996.

"Recycling of Crate Material: Wetherability of Stabilised Recycled High Density Polyethylene", P. Vink, et al., Polymer Degradation and Stability 9 (1984) 133–144.

*Primary Examiner*—Kriellion A. Sanders
(74) *Attorney, Agent, or Firm*—Jimmy L. Funke

(57) ABSTRACT

A moldable elastomeric intumescent material comprises chlorinated polyethylene, plasticizers, phosphate based foaming agents, char forming materials, antioxidants, intumescent materials, flame retardant materials, and graphite and/or expandable graphite. A curing agent, and optionally a co-curing agent or an accelerator, may further be incorporated into the material to improve the rigidity of the material when it is exposed to fire. The composition also possesses enhanced intumescence and flame retardancy properties by the addition of graphite, and preferably expandable graphite, to the composition.

49 Claims, 1 Drawing Sheet

ELASTOMERIC INTUMESCENT MATERIAL

TECHNICAL FIELD

This invention relates to fire protection materials, and, more particularly, to a moldable elastomeric intumescent composition.

BACKGROUND OF THE INVENTION

Various methods exist for the protection of persons and property against fire. Among these methods is the use of flame retardant materials, which generally comprise intumescent composite compounds that swell and form ceramic-like sponges when exposed to the high temperatures generally associated with fires. Typically, intumescent materials are incorporated into coatings or paints and are most often formed into mat-like structures that may be placed between a high fire risk apparatus and an apparatus or area for which fire protection is desired.

Intumescent coatings are generally used on the wall surfaces of buildings, ships, aircraft, motor vehicles, or other vessels intended for human occupancy and which are susceptible to fires. The nature of the intumescent coating allows its thickness to be kept at a minimum until it is activated by high temperatures at which point the coating expands. Such intumescent coatings contain film-forming resins that, upon being subjected to high temperatures, undergo molecular changes that result in corresponding changes in physical properties such as a reduced ability to conduct heat. The intumescent coatings also contain ingredients that will react upon heating to generate gases and form an incombustible or low combustible residue, e.g., char. The expelled gases expand the residue or char into a foam having thermal insulating properties. In many instances a considerable portion of the char produced is a carbon material; the reaction product formed by the dehydration of a polyhydric substance such as a polyalcohol. The char forming reactions of the ingredients occur within the intumescent coating so that when the coating film is heated to beyond a specific elevated temperature, intumescent additives, such as polyhydric alcohol, ammonium hydrogen phosphate and hydrated magnesia, are decomposed, thereby generating water, carbon dioxide, ammonia, and/or other heat absorbing gases that do not readily support combustion. However, although intumescent coatings are readily available, their application to a surface requires a lengthy and complicated process. Often times, a primer is required to promote adhesion to the surface. In addition, the primer and/or intumescent coating require a substantial drying time, sometimes as long as many hours. When these primed intumescent coatings are exposed to fire and intumesce, the coatings transform into a weak sponge that cannot withstand raging drafts and thermal expansion forces that occur as a result of the fire. Oftentimes as a result, the intumescent coating provides only limited protection for a short period of time.

Intumescent mat-like structures are often used in place of coatings to avoid such problems associated with such intumescent coatings. Typically in these flexible intumescent mat-like structures, multiple layers of fire resistant materials having intumescent materials located therebetween form a flexible wrap that provides a consistent and effective fire protection system when the intumescent materials expand. Although such flexible mat-like structures can be manufactured to have sufficient flexibility to conform to the shape of an object to be protected (e.g., conduits, electrical cable, etc.), the mat-like structures require additional hardware or an adhesive in order to be held into place.

Therefore, there exists a need for a moldable elastomeric intumescent thermoplastic material having intumescent properties and capable of conforming to objects without the use of adhesives or their equivalents.

SUMMARY OF THE INVENTION

A mixture for making a moldable intumescent elastomeric thermoplastic material, comprising based on one hundred parts of said mixture: about 40 to about 60 parts of chlorinated polyethylene; up to about 15 parts of high-density polyethylene; about 5 to about 10 parts of a plasticizer; about 10 to about 20 parts of a water emitting substance selected from the group consisting of hydrated magnesium oxide, magnesium hydroxide and mixtures thereof; up to about 10 parts of at least one gas generating compound selected from the group consisting of ammonium dihydrogen phosphate, ammonium polyphosphate and mixtures thereof; about 3 to about 10 parts of a char former selected from the group consisting of polyhydric alcohols, carbohydrates, starch and mixtures thereof; about 1 to about 7 parts of antimony oxide; about 2 to about 12 parts of a filler material selected from the group consisting of graphite, water intercalated graphite, mica, titanium dioxide and mixtures thereof; and about 0.25 to about 2 parts of a stabilizer selected from the group consisting of thio based antioxidants, hindered phenol antioxidants and mixtures thereof.

A moldable intumescent elastomeric composition, comprising based on one hundred parts of said composition: about 40 to about 60 parts of chlorinated polyethylene; up to about 15 parts of high-density polyethylene; about 5 to about 10 parts of a plasticizer; about 10 to about 20 parts of a water emitting substance selected from the group consisting of hydrated magnesium oxide, magnesium hydroxide and mixtures thereof; up to about 10 parts of at least one gas generating compound selected from the group consisting of ammonium dihydrogen phosphate, ammonium polyphosphate and mixtures thereof; about 3 to about 10 parts of a char former selected from the group consisting of polyhydric alcohols, carbohydrates, starch and mixtures thereof; about 1 to about 7 parts of antimony oxide; about 2 to about 12 parts of a filler material selected from the group consisting of graphite, mica, titanium dioxide and mixtures thereof; about 0.25 to about 2 parts of a stabilizer selected from the group consisting of thio based antioxidants, hindered phenol antioxidants and mixtures thereof; up to about 5 parts of a curing agent; and up to about 3 parts of a co-curing agent or an accelerator.

An intumescent elastomeric composition, comprising based on one hundred parts of said composition: about 55 parts of chlorinated polyethylene; up to about 15 parts of high-density polyethylene; about 7 parts of a plasticizer; about 15 parts of a water emitting substance selected from the group consisting of hydrated magnesium oxide, magnesium hydroxide and mixtures thereof; about 8 parts of at least one gas generating compound selected from the group consisting of ammonium dihydrogen phosphate, ammonium polyphosphate and mixtures thereof; about 3 to about 10 parts of a char former selected from the group consisting of polyhydric alcohols, carbohydrates, starch and mixtures thereof; about 1 to about 7 parts of antimony oxide; about 2 to about 12 parts of a filler material selected from the group consisting of graphite, graphite having intercalated water, mica, titanium dioxide and mixtures thereof; about 0.25 to about 5 parts of a stabilizer comprising a mixture of distearylthiodipropionate and hindered phenol in equal parts; about 0.001 to about 5 parts of a curing agent; and up to about 3 parts of a co-curing agent or an accelerator.

A molded article, comprising based on one hundred parts of said article: about 40 to about 60 parts of chlorinated polyethylene; up to about 5 parts of a curing agent; up to about 3 parts of a co-curing agent or an accelerator; up to about 15 parts of high-density polyethylene; about 5 to about 10 parts of a plasticizer; about 10 to about 20 parts of a water emitting substance selected from the group consisting of hydrated magnesium oxide, magnesium hydroxide and mixtures thereof; up to about 10 parts of at least one gas generating compound selected from the group consisting of ammonium dihydrogen phosphate, ammonium polyphosphate and mixtures thereof; about 3 to about 10 parts of a char former selected from the group consisting of polyhydric alcohols, carbohydrates, starch and mixtures thereof; about 1 to about 7 parts of antimony oxide; about 2 to about 12 parts of a filler material selected from the group consisting of graphite, mica, titanium dioxide and mixtures thereof; and about 0.25 to about 2 parts of a stabilizer selected from the group consisting of thio based antioxidants, hindered phenol antioxidants and mixtures thereof.

A composite material, comprising: a reinforcing material selected from the group consisting of steel, plastic, wood, carbon, and combinations comprising at least one of the foregoing; an intumescent polymer binder comprising based on one hundred parts of said binder: about 60 parts chlorinated polyethylene; up to about 5 parts of a curing agent; up to about 3 parts of a co-curing agent or an accelerator; up to about 15 parts high-density polyethylene; about 7 parts plasticizer; about 15 parts hydrated magnesium oxide; about 0.5 parts distearylthiodipropionate; about 0.5 parts hindered phenol; about 5 parts antimony oxide; about 5 parts pentaerythritol; and about 4 to about 12 parts graphite.

A coated article, comprising: a substrate having an intumescent polymer applied thereupon, wherein said intumescent polymer comprises based on one hundred parts of said polymer: about 60 parts of chlorinated polyethylene; up to about 15 parts of high-density polyethylene; about 5 to about 10 parts plasticizer; about 15 parts of a water emitting substance selected from the group consisting of hydrated magnesium oxide, magnesium hydroxide and mixtures thereof; up to about 10 parts of at least one gas generating compound selected from the group consisting of ammonium dihydrogen phosphate, ammonium polyphosphate and mixtures thereof; about 3 to about 10 parts of a char former selected from the group consisting of polyhydric alcohols, carbohydrates, starch and mixtures thereof; about 2 to about 5 parts of antimony oxide; about 2 to about 12 parts of a filler material selected from the group consisting of graphite, graphite containing intercalated water, mica, titanium dioxide and mixtures thereof; and about 0.25 to about 2 parts of a stabilizer selected from the group consisting of thio based antioxidants, hindered phenol antioxidants and mixtures thereof.

A method for forming a moldable intumescent elastomeric composition, comprising based on one hundred parts of said composition: combining under shear at a temperature and for a time sufficient in order to form said composition about 60 parts of chlorinated polyethylene, up to about 15 parts of high-density polyethylene, about 5 to about 10 parts plasticizer, about 10 to about 20 parts of a water emitting substance selected from the group consisting of hydrated magnesium oxide, magnesium hydroxide and mixtures thereof, about 3 to about 10 parts of a char former selected from the group consisting of polyhydric alcohols, carbohydrates, starch and mixtures thereof, about 1 to about 7 parts of antimony oxide, about 0.25 to about 2 parts of a stabilizer selected from the group consisting of thio based antioxidants, hindered phenol antioxidants and mixtures thereof, up to about 10 parts of at least one gas generating compound selected from the group consisting of ammonium dihydrogen phosphate, ammonium polyphosphate and mixtures thereof, about 2 to about 12 parts of a filler material selected from the group consisting of graphite, mica, titanium dioxide and mixtures thereof, up to about 5 parts of a curing agent, and up to about 3 parts of a co-curing agent or an accelerator.

A method for forming a molded article composed in part of an intumescent elastomeric composition, comprising: introducing an elastomeric intumescent composition into a mold, wherein said elastomeric intumescent thermoplastic composition comprises based on one hundred parts of said composition: about 40 to about 60 parts of chlorinated polyethylene; up to about 5 parts of a curing agent; up to about 3 parts of a co-curing agent or an accelerator; up to about 15 parts of high-density polyethylene; about 5 to about 10 parts plasticizer; about 10 to about 20 parts of a water emitting substance selected from the group consisting of hydrated magnesium oxide, magnesium hydroxide and mixtures thereof; up to about 10 parts of at least one gas generating compound selected from the group consisting of ammonium dihydrogen phosphate, ammonium polyphosphate and mixtures thereof; about 3 to about 10 parts of char former selected from the group consisting of polyhydric alcohols, carbohydrates, starch and mixtures thereof; about 1 to about 7 parts of antimony oxide; about 2 to about 12 parts of a filler material selected from the group consisting of graphite, mica, titanium dioxide and mixtures thereof; and about 0.25 to about 2 parts of a stabilizer selected from the group consisting of thio based antioxidants and hindered phenol antioxidants and mixtures thereof; and forming said molded article.

A method for forming a coated article, comprising: disposing an intumescent elastomeric composition onto an article; and forming a coating on said article; wherein said intumescent elastomeric composition comprises based on one hundred parts of said composition: about 40 to about 60 parts of chlorinated polyethylene; up to about 5 parts of a curing agent; up to about 3 parts of a co-curing agent; up to about 15 parts of high-density polyethylene; about 5 to about 10 parts plasticizer; about 10 to about 20 parts of a water emitting substance selected from the group consisting of hydrated magnesium oxide, magnesium hydroxide and mixtures thereof; up to about 10 parts of at least one gas generating compound selected from the group consisting of ammonium dihydrogen phosphate, ammonium polyphosphate and mixtures thereof; about 3 to about 10 parts of a char former selected from the group consisting of polyhydric alcohols, carbohydrates, starch and mixtures thereof; about 1 to about 7 parts of antimony oxide; about 2 to about 12 parts of a filler material selected from the group consisting of graphite, mica, titanium dioxide and mixtures thereof; and about 0.25 to about 2 parts of a stabilizer selected from the group consisting of thio based antioxidants, hindered phenol antioxidants and mixtures thereof.

The above described and other features are exemplified by the following figures and detailed description.

BRIEF DESCRIPTION OF THE DRAWINGS

Referring now to the figures wherein the like elements are numbered alike.

DETAILED DESCRIPTION OF THE INVENTION

Figure 1:
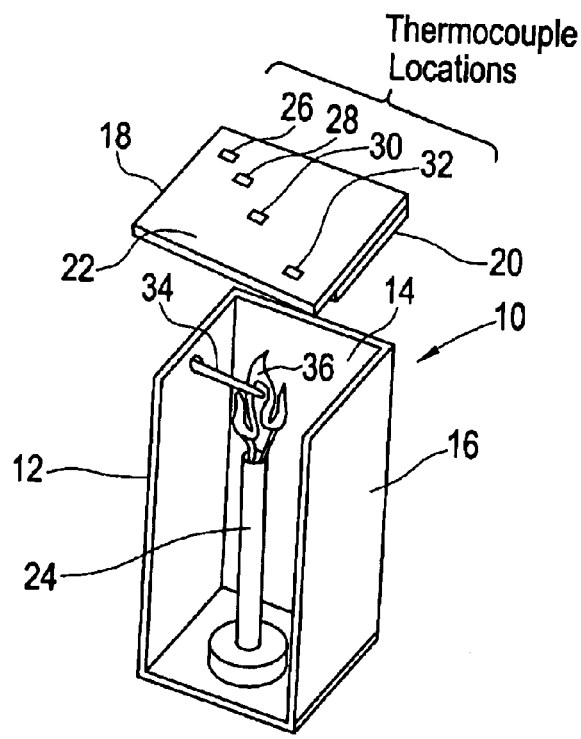
FIG. 1 is a perspective view of an intumescent flammability test apparatus used for measuring the efficiency of moldable intumescent composite materials of the present invention.

An elastomeric intumescent material generally comprises a mixture of chlorinated polyethylene, high-density polyethylene, plasticizer, char-forming materials, phosphate based foaming agent, intumescing materials, antioxidants, flame retardant materials and graphite. However, glass in any form such as fibers, fibrils, particles and the like, tends to diminish the performance of the composite material's elastomeric properties, and is not included. The mixture combines elastomeric behavior with intumescence, which produces a material that is conformable to various shapes, elastic to allow stretching, deformable to absorb energy.

The elastomeric intumescent material provides intumescent molding compositions that can be extruded, blow molded, injection molded, compression molded or otherwise suitably molded and shaped to a desired geometry or configuration by thermal processes. In some applications, the molded part may be intended to serve primarily as a heat or fire barrier. In other applications, the material will coat a flexible article such as a wire. More often, it will also serve another functional purpose and serve incidentally as a heat or fire barrier. For example, the elastomer intumescent composition can be formed as a sheet or molded, e.g., into a cover, and heated and pressed, laminated, or bonded to a reinforcing material such as steel, plastic, carbon, wood, combinations comprising at least one of the foregoing, and the like, to form a composite material. In either case, the invention provides a moldable material mixture that can be formed into a molded product in a suitable manufacturing facility and transported for efficient handling at an automobile assembly line or at a construction site or the like. Thus, the subject composition facilitates efficient manufacture and assembly and provides robust physical and fire-resistant properties in use.

The values in Table 1 opposite each ingredient are parts by weight, and the numbers for each moldable composition mixture total 100. Table 1 illustrates several formulations of a moldable elastomeric intumescent composition in which a suitable high-density polyethylene and a suitable chlorinated polyethylene are used together to form a thermoplastic elastomeric-based composition. The "range" column also discloses a family of suitable compositions in which the CPE is used in combination or alone. Thus, CPE is present in an amount sufficient to form a suitable moldable composition and molded product. As further illustrated in the formulations of Table 1, it will be shown that when graphite and/or expandable graphite is substituted for an ammonia producing compound, the degree of intumescence and fire shielding properties of the composition improves, and the composition does not emit ammonia gas when heated.

TABLE 1

| INGREDIENT | Sample 1 | Sample 2 | Sample 3 | Sample 4 | Sample 5 | Sample 6 |
| --- | --- | --- | --- | --- | --- | --- |
| Chlorinated polyethylene | 55 | 50 | 45 | 45 | 50 | 50 |
| High Density Polyethylene | — | 5 | 10 | 10 | 5 | 5 |
| Chlorowax | 7 | 7 | 7 | 7 | 7 | 7 |
| Phosphate-based foaming agent | 8 | 8 | 8 | 8 | — | 4 |
| Hydrated magnesium oxide | 15 | 15 | 15 | 15 | 15 | 15 |
| Distearyl-Thiopropionate | 0.5 | 0.5 | 0.5 | 0.5 | 0.5 | 0.5 |
| Hindered Phenol | 0.5 | 0.5 | 0.5 | 0.5 | 0.5 | 0.5 |
| Antimony Oxide | 5 | 5 | 5 | 5 | 5 | 2 |
| Pentaerythritol | 5 | 5 | 5 | 5 | 5 | 5 |
| Graphite | 4 | 4 | 4 | — | — | — |
| Graphite (expandable) | — | — | — | 4 | 12 | 11 |

The polyethylene constituent of the formulations has a density in the range of 0.940 to 0.970 g/cm3. Such materials are produced using suitable known catalysts at a relatively low pressure of ethylene. Such high-density polyethylenes are available with molecular weight ranging from about 10,000 (usually waxes) to ultra high molecular weight HDPE (UHMW-HDPE) of several millions. Wide variation of branching and density are also available.

Many grades of high-density polyethylene (HDPE) can be used in this invention depending on the application and the method of processing. High molecular weight/high melt viscosity grades are used for blow molding applications. Low melt viscosity grades are preferred for injection molding. Extrusion is normally performed using intermediate melt viscosities. High-density polyethylene by itself could be formulated into an intumescent material; however, it will not be elastomeric.

Chlorinated polyethylene (CPE), suitably with about 36 to 42% by weight chlorine, is preferably combined with HDPE in accordance with the invention at different ratios to produce moldable intumescent thermoplastic elastomer grades with varying degrees of hardness. CPE can also be formulated into an intumescent material without HDPE but only through the addition of a small concentration of curing agents. The intumescent composition formed will be highly elastomeric and will act as an efficient noise and vibration isolator, especially if the material is foamed during processing. A suitable commercial example of CPE is TYRIN® 3615P available from DuPont Dow Elastomers Co., Midland, Mich., containing 36% by weight chlorine and having a residual degree of crystallinity of less than 2 percent.

Generally, the amount of CPE to HDPE in the formulation is a ratio of greater than 4:1, wherein the amount of CPE and HDPE combined is about 40 to about 60 parts by weight based on the total weight of the formulation. A ratio of less than 4:1 of CPE to HDPE produces a composition lacking the desired elastomeric quality. Preferably, the amount of CPE present is about 45 to about 55 parts by weight based on the total weight of the formulation, and not lower than about 45 parts by weight. The amount of HDPE present is up to about 15 parts by weight, and about 5 to about 10 parts by weight based on the total weight of the formulation. Preferably, the amount of HDPE is present at about 5 to about 10 parts by weight based on the total weight of the formulation.

Chlorowax, or other suitable plasticizer such as PAROIL 145, commercially available from Dover Corporation, Industrial Division, Canada, is employed when a plasticizer is desired or required. The plasticizer's presence in the formulation will improve low temperature properties of the intumescent CPE/HDPE thermoplastic elastomer mixture. An added advantage of a plasticizer is that it contributes to the char formation during burning of the intumescent material. The amount of plasticizer, or other suitable plasticizer, present in the formulation is about 5 to about 10 parts by weight based on the total weight of the formulation.

The presence of at least one gas generating compound such as ammonium dihydrogen phosphate (or ammonium polyphosphate) promotes char formation, leads to a strong structure of the intumescent material structure after burning, and helps in the intumescence process by emitting ammonia gas during burning. As the ammonia gas diffuses through the elastomeric intumescent composition, the material softens and the diffusion causes air pockets to form, making the material become porous. The increased porosity of the material improves its thermal insulation characteristics. The amount of the gas generating compound present in the formulation is up to about 10 parts by weight based on the total weight of the composition. Preferably, the gas generating compound is present at about 1 to about 8 parts by weight based on the total weight of the formulation. A suitable foaming agent is PHOSCHECK P/30, an ammonium polyphosphate, commercially available from Monsanto Company, St. Louis, Mo.

At least one or more water emitting substances such as hydrated alumina, hydrated magnesia, magnesium oxide, metal carbonates, bicarbonates, azides and other nitrogen containing compounds, mixtures thereof, and the like, are included to emit gases during burning, and act to induce intumescence and cool down the fire. In addition, magnesium oxide acts as a dehydrochlorination stabilizer, that is, the magnesium oxide has a tendency to absorb hydrochloric acid gas that is produced and evolved during the thermal decomposition of the CPE. The amount of such water emitting substances present in the formulation is about 10 to about 20 parts by weight based on the total weight of the formulation. Preferably, one or more water emitting substances, such as hydrated magnesium oxide, or hydrated magnesium oxide and magnesium hydroxide, are present at levels of less than or about 15 parts by weight based on the total weight of the formulation. A suitable commercial example of hydrated alumina is available as MARTINAL OL-104C from Lonza, Inc., Fair Lawn, N.J., while a suitable magnesia is commercially available as MAGSHIELD 98 from Martin Marietta, Baltimore, Md., among other sources.

Pentaerythritol as monomolecular and/or bimolecular forms is a very effective char former. In addition, other suitable char formers include other polyhydric alcohols, as well as carbohydrates, starch and mixtures thereof. Such char formers are present in the formulation at about 3 to about 10 parts by weight based on the total weight of the formulation. One suitable commercial example of a char formation agent is a blend of monopentaerythritol and dipentaerythritol (bimolecular form of pentaerythritol), which is commercially available as PERSTORP PE from Perstorp Compounds, Inc., Florence, Mass.

Both the thio-based antioxidants, e.g., distearylthiodipropionate, and the hindered phenol antioxidants are effective in stabilizing the intumescent material against thermal oxidation, especially if used together as co-synergists. Hindered phenols allow the addition of free radicals generated during polymer oxidation and deactivate them to slow down the oxidation process, while sulfur and amine compounds react in the termination step of the autocatalytic oxidation of polymers, thus changing active free radicals to inactive compounds, which slows down the oxidative degradation. The combination of both compounds has been found to produce a synergistic effect. The amounts of such stabilizers present in the formulation are about 0.25 to about 2 parts by weight based on the total weight of the formulation. Preferably, the stabilizers are present in equal amounts, the total amount being within the range of about 0.25 to about 2 parts by weight.

Distearylthiodipropionate is commercially available as DSDTP from Witco Corporation, Greenwich, Conn., and the phenol is available as WINGSTAY L from R. T. Vanderbilt, Norwalk, Conn. Other suitable commercial examples include antioxidants based on hindered phenols, such as Irganox 1010 commercially available from Ciba Geigy, or sulfur compounds, such as Vanax A commercially available from R. T. Vanderbilt, or amine containing compounds, such as Agerite White commercially available from R. T. Vanderbilt.

The presence of antimony oxide is quite optional. This compound provides added flame retardancy to the formulation by reacting with chlorinated polyethylene and chlorowax to form antimony chloride. Antimony chloride sublimes during fire and quenches free radicals in the gaseous phase to slow down the burning process and reduce smoke when the elastomeric intumescent material burns. Other suitable materials that may reduce smoke include zinc borate, cobalt and manganese organic compounds. When utilized, the amount of antimony oxide, or other suitable flame retardant composition, e.g., zinc borate, present in the formulation is about 1 to about 7 parts by weight based on the total weight of the formulation. Preferably, antimony oxide is present at about 2 to about 5 parts by weight based on the total weight of the formulation.

Graphite, mica, titanium dioxide, other suitable filler materials and mixtures thereof, are added to the mixture for color, some reinforcement and to enhance processing conditions. Expandable graphite, i.e., graphite containing intercalated water, is effective in enhancing intumescence. The graphite expands upon exposure to heat or fire, which improves intumescence, e.g., when used as a flame retardant material. The amount of filler materials, including the expandable graphite, present in the formulation is about 2 to about 12 parts by weight based on the total amount of formulation. Preferably, the amount of filler materials is greater than 10 parts by weight, or from about 4 to about 12 parts by weight based on the total weight of the formulation. A suitable graphite is Asbury A-60, commercially available from Asbury Carbons, Asbury, N.J., and a suitable expandable graphite is Asbury Dxn 3579, commercially available from Asbury Carbons, Asbury, N.J. As illustrated in Table 1, and in the experimental data of Table 2, the ammonia producing compound is substituted with graphite or expandable graphite to produce an elastomeric intumescent composition having improved mechanical properties, intumescence and fire shielding properties.

All of the components disclosed herein may be utilized in the form of particles, fibers, powder, spheres, nanotubes, nanospheres, and the like, as well as combinations comprising at least one of the foregoing forms, can be employed.

All of the formulations listed in Table 1 can be chemically cross-linked using one or more curing agents. Suitable curing agents include but are not limited to peroxide curing systems, sulfur curing systems, combinations comprising at least one of the foregoing, and the like. Other co-curing agents and/or accelerators can also be employed. For example, suitable peroxide curing systems include dicumyl peroxide, and an accelerator such as trimethylol propane trimethacrylate. These agents improve the rigidity of the elastomeric intumescent thermoplastic composition, especially upon exposure to fire. A suitable commercial peroxide system includes dicumyl peroxide, which is commercially available as DICUP 40KE from Hercules Inc., Wilmington, Del., and TMPT, which is available as a liquid or adsorbed to the surface of silica powder (Saret 500) from Sartomer Company, Inc., Exton, Pa.

The amount of curing agent, and optionally accelerator or co-curing agent, is based upon the desired properties of the material. Generally, the amount of curing agent present in the composition can be about 0.001 to about 15 parts by weight based on the total weight of the polymers/elastomers or composition, and the amount of co-curing agent or accelerator present can optionally be about 0.001 to about 10 parts by weight based on the total weight of the polymers/elastomers or composition. Preferably, about 0.05 to about 5 parts by weight of one or more curing agents can be present, and optionally about 0.05 to about 3 parts by weight of one or more co-curing agents or accelerators can be present.

For example, formulations comprising about 0.001 to about 5 parts by weight of curing agent based on the total amount of polymers/elastomers in the formulation, and optionally about 0.001 to about 3 parts by weight of accelerator or co-curing agent based on the total amount of polymers/elastomers in the formulation are considered lightly cross linked formulations which are formed by conventional plastic techniques and exhibit improved properties without sacrificing processability and the ability for recycling. In contrast, formulations comprising about 5 to about 10 parts by weight of curing agent based on the total amount of polymers/elastomers in the formulation, and optionally about 3 to about 7 parts by weight of accelerator or co-curing agent based on the total amount of polymers/elastomers in the formulation are considered highly cross linked formulations which exhibit low compression set but sacrifices the ability to reprocess, or recycle the polymers and elastomers by melt flow process. Generally, cross-linked elastomers improve creep, compression set, tensile strength and modulus properties. As will be discussed further below, cross-linking lowers ultimate elongation to which the material can be extended prior to failure.

Mixing of the Compositions

The mixing of the formulations conducted on a laboratory scale was achieved by several methods including mixing on a two-roll mill preheated from about 50 to about 80° C., with about 65° C. preferable. The components of each formulation, excluding the intumescent materials, were added to the rolls and shear mixed for about 2 to about 10 minutes, with about 5 minutes preferable. The actual temperature of the mixture during mixing approached about 150° C. due to shearing. The intumescence ingredients were added next, preferably in a fine powder form, and mixed with the initial components for about 5 to about 10 minutes.

In alternative practices, formulations were also prepared by mixing in a Brabender bowl, which is a small internal mixer, and in a large Banbury internal mixer. In these practices, for example, the cavity of the Brabender bowl is preheated to about 90 to about 150° C., with about 120° C. preferred, prior adding any components. A first batch of components such as chlorinated polyethylene and high density polyethylene, hydrated magnesium oxide, hydrated alumina, DSTDP, antimony oxide, pentaerythritol and chlorowax were added to the bowl. The mixing speed of the bowl was then increased to and maintained at about 120 revolutions per minute, and the components were mixed for about one to about five minutes, with about 2 to about 3 minutes preferred. During this first stage, the temperature of the cavity was not permitted to rise above about 140° C. Additional components such as ammonium dihydrogen phosphate, curing agent, and optional co-curing agent or accelerator, were then added to the mixture and mixed. During this second stage, the temperature of the cavity was not permitted to rise above 160° C. in order to prevent the degradation or decomposition of the component(s). The mixture was then removed from the bowl and emptied onto a mill to further mix and sheet out the material. A 2-pound Banbury internal mixer was also employed to produce the elastomer intumescent thermoplastic material using process conditions similar to those employed with the Brabender bowl.

Yet another example of producing the formulations disclosed herein employs a Brabender extruder. The effect of temperature and shear rate has been investigated with this extruding device. The temperatures of the three extruder barrel zones and the die were all varied between about 150 to about 175° C. Three settings of the screw speeds were investigated, that is, about 50, about 75 and about 100 rpm. The length-to-diameter ratio of the screw was set at 20 to 1, and the compression ratio was 1. As observed during the process, the material extruded well and exhibited good mixing under all of the above-mentioned process conditions.

Large scale or industrial size/grade batches may be prepared using a twin screw Buss kneader or a large Banbury internal mixer, i.e., greater than 2-pounds. One skilled in the art can adjust the temperature conditions and shear rates based upon the conditions employed in laboratory scale production to achieve the desired industrial size/grade elastomeric intumescent thermoplastic material.

Processing of the Composition

Molding of the composition was accomplished by compression molding, injection molding, vacuum forming, blow molding, and the like. Standard dumbbells and sample sheets measuring 50 millimeters (mm) gauge in length by a 6.25 mm in width by 2 mm in thickness of each formulation were injection molded, and die cut from a compression molded slab. Standard heat deflection bars measuring 127 mm by 152 mm by 2.75 mm were also prepared by injection molding.

The tensile properties of the formulations listed in Table 1 are presented in Table 2. The properties measures were tensile strength, modulus at 100% strain, strain at break, and tear strength. In addition to testing each formulation's mechanical properties, two fire shielding characteristics are also included in Table 2.

TABLE 2

| Property | TM* | Sample 1 | Sample 2 | Sample 3 | Sample 4 | Sample 5 | Sample 6 |
|---|---|---|---|---|---|---|---|
| Tensile Strength (MPa) | D638 | 5.3 | 5.5 | 4.9 | 6.3 | 5.5 | 4.2 |
| Modulus @ 100% Strain (MPa) | D790 | 1.1 | 1.6 | 2.6 | 1.7 | 1.2 | 1.6 |
| Strain at Break (%) | | 1293 | 1081 | 783 | 1114 | 1308 | 821 |
| Tear Strength (N/mm) | D624 | 19 | 25 | 29 | 25 | 22 | 27 |
| Shielding Efficiency (Max. Temp. ° C.) | | 247 | 201 | 242 | 268 | 298 | 262 |
| Intumescence (%) | | 96 | 64 | 73 | 106 | 156 | 144 |

Mechanical Properties

The tensile properties of the injection molded samples of each formulation were obtained using ASTM D638 procedures. The tear properties of each formulation sample were obtained using procedures outlined in ASTM D624. The flexural properties (Modulus @100% strain) were determined per ASTM D790 procedures. The test results are shown in Table 2. In addition, the tension set (not shown) was determined for Sample 1. Sample 1 exhibited a tension set of about zero after being stretched to 100% elongation when measured on the sample (50 mm×6.25 mm×2 mm) according to ASTM D412 procedures. All of the American Society for Testing and Materials (ASTM) procedures referenced herein are incorporated herein by reference.

Intumescent Test Apparatus

The main function of the elastomeric intumescent material is in resisting the spread of flame from a fire source and shielding articles protected by the intumescent materials from high temperature rise. The characteristics or property of intumescence efficiency is measured by a procedure using an apparatus described below.

All of the formulations illustrated in this specification have been tested as intumescent compositions to be used for resisting the spread of a flame from a fire source and curtailing temperature rise. The characteristic or property of Intumescence Efficiency as ascribed to moldings of the disclosed formulations were determined in an apparatus and by a practice as follows. When reference is made to such property in this specification or claims, it is intended that the property be determined utilizing such an apparatus or the equivalent and such practices.

The Intumescence Efficiency test apparatus is shown in FIG. 1. Apparatus 10 included a three-wall steel chamber comprising left sidewall 12, back wall 14 and right side wall 16. Each wall was a steel plate 229 mm high, 127 mm wide and 1 mm thick. The plates were joined at their edges as shown in FIG. 1 to form a generally square-shaped (in cross section) chamber with an open front.

A 152 mm by 152 mm by 1 mm thick steel plate adapted to be placed on top of walls 12, 14 and 16 was employed as a roof member 18. During a test, the roof member 18 carried affixed to its lower surface an above-described molded sample sheet 20 of a formulation of Table 1 to be tested for Intumescence Efficiency. Note that the thickness of 2.75 mm of the test specimen (as well as its composition) is important to the reproducibility of this test. As shown, the sample sheet 20 faces downward inside of the roof 18 and chamber during the test. On the top surface 22 of the steel roof panel 18 were located four thermocouple leads in the locations indicated, respectively 26, 28, 30, and 32.

A 165 mm tall Bunsen burner 24 was used as the flame source. The height of the burner did not include the flame height. The flame height was of the order of 60 mm, and it was adjusted during each test so that the tip of the inner blue cone of the flame 36, its hottest part, touched the surface of the intumescent material. A thermocouple indicated at 34 was placed at the lower surface of the heat deflection bar 20 and upper portion of the flame 36 to measure the flame temperature as it impinged on the intumescent material at that point. The flame temperature as measured by thermocouple 34 was at a location on the intumescent material opposite the location of thermocouple 30 on the top surface 22 of the steel roof member 18.

While five thermocouple locations as indicated in FIG. 1 were initially used in testing of intumescence efficiency, experience has shown that equivalent useful data is obtained from using only four thermocouples at locations 26, 30, 32 and 34.

Significant Properties of the Intumescent Material

Figure 2:
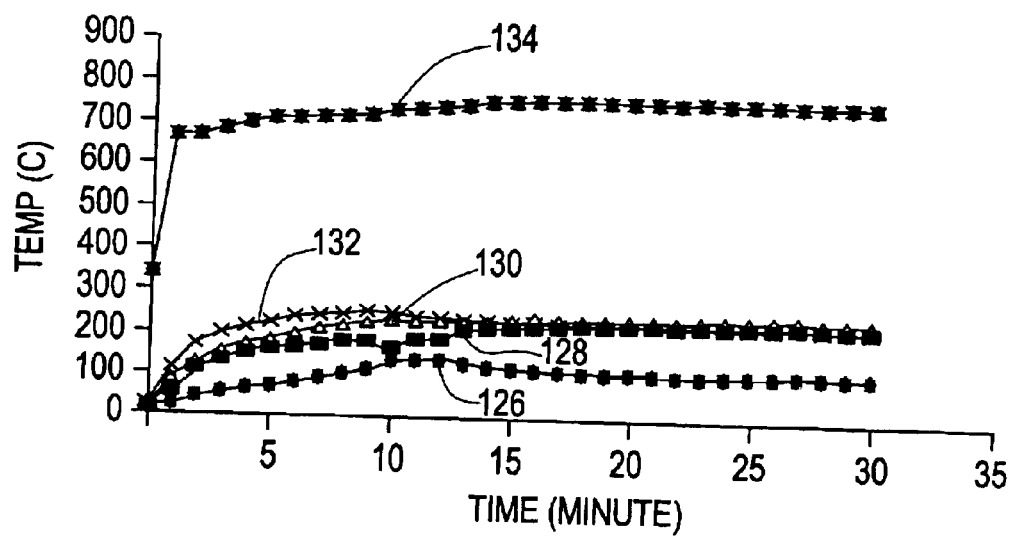
FIG. 2 is a graph depicting temperature versus time at different locations on a steel plate protected by the moldable intumescent thermoplastic composition.

The molded sample sheets comprising each of the formulations of Table 1 were exposed to the flame of the Bunsen burner in the test apparatus 10. FIG. 2 is a graph of temperature (in degrees Celsius) versus time (in minutes) of the thermocouple measured temperatures at locations 26, 28, 30 and 32 on the top surface 22 of steel plate 24 protected by the heat deflection bar of Formulation 1. The curve for the flame temperature in FIG. 2 is designated 34. The curves for the other thermocouple readings in FIG. 2 are designated with the number of their thermocouple location.

FIG. 2 is a graph of temperature (in degrees Celsius) versus time (minutes) of exposure to the Bunsen burner flame of the thermocouples measured temperatures at four locations on the top surface of a steel plate protected by the sample sheet. The flame temperature of the Bunsen burner is set at over 1000° C. The highest temperature measured by the thermocouple in direct contact of the flame reaches a maximum temperature of about 850° C. The temperature reading does not reach the expected temperature because of the cooling effect of the gases from the intumescent material and because when the material of the sample sheet intumesces and swells, it comes in contact with the flame thermocouple and also cools it. As illustrated in FIG. 2, the maximum temperature reached on the top surface of the steel plate is about 247° C., which indicates that the intumescent material was very effective in decreasing the heat flow to the steel plate. Thus, the Intumescence Efficiency of this molded slab is determined to be about 247° C.

Maximum temperatures for the other samples range between 201° C. and 298° C. Comparing Samples 1–3, which include Phoscheck®, with Samples 4–6, which include expandable graphite, it is observed that the properties of Samples 1–3 and Sample 5 are very similar to each other. However, Sample 5 exhibited the highest intumescence of all samples. This result may be attributable to the enhanced fire retardancy imparted to the corresponding compositions by the expandable graphite. Similar results are obtained for Samples 4 and 6 (using combinations of Phoscheck® and expandable graphite).

Upon exposure to the extreme temperatures generated by a fire, the composite material swells to form a ceramic-like sponge, which is effective as a heat and fire barrier. Upon burning, the elastomeric intumescent composite materials will not melt, but instead will form a relatively strong foam barrier of char and inorganic ceramic-like material. The elastomeric intumescent composite material containing expandable graphite has improved fire retardant properties over intumescent composite materials containing ammonium dihydrogen phosphate. The substitution of expandable graphite further lowers the overall cost of the elastomeric intumescent thermoplastic composition. Moreover, because the composite material does not include ammonium-based components, an ammonia odor is not produced when the elastomeric intumescent composite material is exposed to heat or fire.

In addition, the elastomeric intumescent thermoplastic composition containing expandable graphite has certain physical properties, as presented above, which impart desirable characteristics to moldings fabricated from the elastomeric intumescent thermoplastic composition. Moreover, these physical properties include tensile strengths, elongation ratios, tear strength values, shielding efficiency, and intumescence substantially equivalent to or better than moldings comprising ammonia dihydrogen phosphate. These properties lend sufficient strength and durability to the moldings so as to render the moldings useful when employed as a cover for electrical wiring or seals for doors, windows, automotive parts, or other apertures, or it may be used to form panels, dashboards, consoles, or other parts for use in automobile, aircraft, or marine applications, or it may be used as fire shielding or thermal shielding for residential and industrial building use, as well as other applications that will become obvious to those skilled in various arts. In addition to molding, the material may be extruded or vacuum formed to make parts that can be readily assembled into a final product.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A mixture for making a moldable intumescent elastomeric thermoplastic material, comprising based on one hundred parts of said mixture:

about 40 to about 60 parts of chlorinated polyethylene;

up to about 15 parts of high-density polyethylene;

about 5 to about 10 parts of a plasticizer;

about 10 to about 20 parts of a water emitting substance selected from the group consisting of hydrated magnesium oxide, magnesium hydroxide and mixtures thereof;

up to about 10 parts of at least one gas generating compound selected from the group consisting of ammonium dihydrogen phosphate, ammonium polyphosphate and mixtures thereof;

about 3 to about 10 parts of a char former selected from the group consisting of polyhydric alcohols, carbohydrates, starch and mixtures thereof;

about 1 to about 7 parts of antimony oxide;

and about 0.25 to about 2 parts of a stabilizer selected from the group consisting of thio based antioxidants, hindered phenol antioxidants and mixtures thereof.

2. The mixture of claim 1 wherein said high-density polyethylene is present at about 5 to about 10 parts.

3. The mixture of claim 2 wherein said chlorinated polyethylene is present at about 45 to about 50 parts.

4. The mixture of claim 3 wherein said graphite is water intercalated graphite and is present at about 2 about 12 parts.

5. The mixture of claim 4 wherein said mixture is free of an ammonia producing compound.

6. The mixture of claim 4 wherein said hydrated magnesium oxide, magnesium hydroxide, and mixtures thereof are present at a level of less than about 15 parts.

7. The mixture of claim 3 wherein said stabilizer contains equal parts of distearylthiodipropionate and hindered phenol.

8. A moldable intumescent thermoplastic composition, comprising based on one hundred parts of said composition:

about 40 to about 60 parts of chlorinated polyethylene;

up to about 15 parts of high-density polyethylene;

about 5 to about 10 parts of a plasticizer;

about 10 to about 20 parts of a water emitting substance selected from the group consisting of hydrated magnesium oxide, magnesium hydroxide and mixtures thereof;

up to about 10 parts of at least one gas generating compound selected from the group consisting of ammonium dihydrogen phosphate, ammonium polyphosphate and mixtures thereof;

about 3 to about 10 parts of a char former selected from the group consisting of polyhydric alcohols, carbohydrates, starch and mixtures thereof;

about 1 to about 7 parts of antimony oxide;

graphite;

about 0.25 to about 2 parts of a stabilizer selected from the group consisting of thio based antioxidants, hindered phenol antioxidants and mixtures thereof;

up to about 5 parts of a curing agent; and up to about 3 parts of a co-curing agent or an accelerator.

9. The composition of claim 8 wherein said high-density polyethylene is present at about 5 to about 10 parts.

10. The composition of claim 9 wherein said chlorinated polyethylene is present at about 45 to about 50 parts.

11. The composition of claim 10 wherein said graphite is water intercalated graphite and is present at about 2 to 12 parts.

12. The composition of claim 11 wherein said composition is free of an ammonia producing compound.

13. The composition of claim 11 wherein said hydrated magnesium oxide and magnesium hydroxide or mixtures thereof is present at a level of less than about 15 parts.

14. The composition of claim 10 wherein said stabilizer contains equal parts of distearylthiodipropionate and hindered phenol.

15. The composition of claim 8, wherein said composition has a tension set of about zero after being stretched to 100% elongation when measured on a sample of 50 millimeters by 6.25 millimeters by 2 millimeters according to ASTM D412.

16. An intumescent elastomeric thermoplastic composition, comprising based on one hundred parts of said composition:
   about 55 parts of chlorinated polyethylene;
   up to about 15 parts of high-density polyethylene;
   about 7 parts of a plasticizer;
   about 15 parts of a water emitting substance selected from the group consisting of hydrated magnesium oxide, magnesium hydroxide and mixtures thereof;
   about 8 parts of at least one gas generating compound selected from the group consisting of ammonium dihydrogen phosphate, ammonium polyphosphate and mixtures thereof;
   about 3 to about 10 parts of a char former selected from the group consisting of polyhydric alcohols, carbohydrates, starch and mixtures thereof;
   about 1 to about 7 parts of antimony oxide;
   about 0.25 to about 5 parts of a stabilizer comprising a mixture of distearylthiodipropionate and hindered phenol in equal parts;
   about 0.001 to about 5 parts of a curing agent; and
   up to about 3 parts of a co-curing agent or an accelerator.

17. A molded article, comprising based on one hundred parts of said article:
   about 40 to about 60 parts of chlorinated polyethylene;
   up to about 5 parts of a curing agent;
   up to about 3 parts of a co-curing agent or an accelerator;
   up to about 15 parts of high-density polyethylene;
   about 5 to about 10 parts of a plasticizer;
   about 10 to about 20 parts of a water emitting substance selected from the group consisting of hydrated magnesium oxide, magnesium hydroxide and mixtures thereof;
   up to about 10 parts of at least one gas generating compound selected from the group consisting of ammonium dihydrogen phosphate, ammonium polyphosphate and mixtures thereof;
   about 3 to about 10 parts of a char former selected from the group consisting of polyhydric alcohols, carbohydrates, starch and mixtures thereof;
   about 1 to about 7 parts of antimony oxide;
   graphite; and
   about 0.25 to about 2 parts of a stabilizer selected from the group consisting of thio based antioxidants, hindered phenol antioxidants and mixtures thereof.

18. The molded article of claim 17 wherein said curing agent is selected from the group consisting of peroxide based curing system, sulfur based curing system, and combinations comprising at least one of the foregoing, and is present at about 0.05 to about 5 parts.

19. The molded article of claim 17 wherein said curing agent and said co-curing agent are present in equal amounts.

20. The molded article of claim 17 wherein said high-density polyethylene is present at about 5 to about 10 parts.

21. The molded article of claim 20 wherein said chlorinated polyethylene is present at about 45 to about 50 parts.

22. The molded article of claim 16 wherein said hydrated magnesium oxide, magnesium hydroxide, and mixtures thereof is present at a level of less than about 15 parts.

23. The molded article of claim 21 wherein said stabilizer contains equal parts of distearylthiodipropionate and hindered phenol.

24. The molded article of claim 17 wherein said graphite is water intercalated graphite and is present at about 2 to about 12 parts.

25. The molded article of claim 17 wherein said molded article is free of an ammonia producing compound.

26. The molded article of claim 17 wherein said molded article is selected from the group consisting of a ceiling tile, floor tile, wall tile, gasket, dashboard, tubing, floor covering, kick panel, bulkhead, interior trim, and combinations comprising at least one of the foregoing.

27. A coated article, comprising:
   a substrate having an intumescent polymer applied thereupon, wherein said intumescent polymer comprises based on one hundred parts of said polymer:
   about 60 parts of chlorinated polyethylene;
   up to about 15 parts of high-density polyethylene;
   about 5 to about 10 parts plasticizer;
   about 15 parts of a water emitting substance selected from the group consisting of hydrated magnesium oxide, magnesium hydroxide and mixtures thereof;
   up to about 10 parts of at least one gas generating compound selected from the group consisting of ammonium dihydrogen phosphate, ammonium polyphosphate and mixtures thereof;
   about 3 to about 10 parts of a char former selected from the group consisting of polyhydric alcohols, carbohydrates, starch and mixtures thereof;
   about 2 to about 5 parts of antimony oxide;
   about 2 to about 12 parts of a filler material selected from the group consisting of graphite, graphite containing intercalated water, mica, titanium dioxide and mixtures thereof; and
   about 0.25 to about 2 parts of a stabilizer selected from the group consisting of thio based antioxidants, hindered phenol antioxidants and mixtures thereof.

28. The coated article of claim 27 further comprising a primer disposed on said substrate, and between said substrate and said intumescent polymer.

29. The coated article of claim 27 further comprising an adhesive disposed on said substrate, and between said substrate and said intumescent polymer.

30. The coated article of claim 27 wherein said filler material is graphite which contains intercalated water.

31. The coated article of claim 27 wherein the coated article is flexible.

32. A method for forming a moldable intumescent elastomeric thermoplastic composition, comprising based on one hundred parts of said composition:
   combining under shear at a temperature and for a time sufficient in order to form said composition about 60 parts of chlorinated polyethylene,
   up to about 15 parts of high-density polyethylene,
   about 5 to about 10 parts plasticizer,
   about 10 to about 20 parts of a water emitting substance selected from the group consisting of hydrated magnesium oxide, magnesium hydroxide and mixtures thereof, about 3 to about 10 parts of a char former selected from the group consisting of polyhydric alcohols, carbohydrates, starch and mixtures thereof, about 1 to about 7 parts of antimony oxide, about 0.25 to about 2 parts of a stabilizer selected from the group consisting of thio based antioxidants, hindered phenol antioxidants and mixtures thereof, up to about 10 parts of at least one gas generating compound selected from the group consisting of ammonium dihydrogen phosphate, ammonium polyphosphate and mixtures thereof, about 2 to about 12 parts of a filler material selected from the group consisting of graphite, mica, titanium dioxide and mixtures thereof, up to about 5 parts of a curing agent, and up to about 3 parts of a co-curing agent or an accelerator.

33. The method of claim 32 wherein combining under shear comprises combining under a first shear for about 1 to about 10 minutes and at about 100 to about 200° C.

34. The method of claim 32 wherein combining under shear comprises combining under a second shear for about 1 to about 10 minutes and at about 75 to about 200° C.

35. A moldable intumescent elastomeric thermoplastic composition formed according to the method of claim 32, wherein said composition has a tension set of about zero after being stretched to 100% elongation when measured on a sample measuring 50 millimeters by 6.25 millimeters by 2 millimeters according to ASTM D412.

36. A molded article comprising the intumescent elastomeric composition of claim 35, wherein the molded article is flexible.

37. A method for forming a molded article composed in part of an intumescent elastomeric composition, comprising:

introducing an elastomeric intumescent thermoplastic composition into a mold, wherein said elastomeric intumescent thermoplastic composition comprises based on one hundred parts of said composition:

about 40 to about 60 parts of chlorinated polyethylene;

up to about 5 parts of a curing agent;

up to about 3 parts of a co-curing agent or an accelerator;

up to about 15 parts of high-density polyethylene;

about 5 to about 10 parts plasticizer;

about 10 to about 20 parts of a water emitting substance selected from the group consisting of hydrated magnesium oxide, magnesium hydroxide and mixtures thereof;

up to about 10 parts of at least one gas generating compound selected from the group consisting of ammonium dihydrogen phosphate, ammonium polyphosphate and mixtures thereof;

about 3 to about 10 parts of char former selected from the group consisting of polyhydric alcohols, carbohydrates, starch and mixtures thereof;

about 1 to about 7 parts of antimony oxide;

graphite;

about 0.25 to about 2 parts of a stabilizer selected from the group consisting of thio based antioxidants and hindered phenol antioxidants and mixtures thereof; and forming said molded article.

38. The method of claim 37 wherein forming is selected from the group consisting of extrusion, injection molding, compression molding, and vacuum forming.

39. A method for forming a coated article, comprising:

disposing an intumescent elastomeric thermoplastic composition onto an article; and forming a coating on said article;

wherein said intumescent elastomeric composition comprises based on one hundred parts of said composition:

about 40 to about 60 parts of chlorinated polyethylene;

up to about 5 parts of a curing agent;

up to about 3 parts of a co-curing agent or an accelerator;

up to about 15 parts of high-density polyethylene;

about 5 to about 10 parts plasticizer;

about 10 to about 20 parts of a water emitting substance selected from the group consisting of hydrated magnesium oxide, magnesium hydroxide and mixtures thereof;

up to about 10 parts of at least one gas generating compound selected from the group consisting of ammonium dihydrogen phosphate, ammonium polyphosphate and mixtures thereof;

about 3 to about 10 parts of a char former selected from the group consisting of polyhydric alcohols, carbohydrates, starch and mixtures thereof;

about 1 to about 7 parts of antimony oxide;

about 2 to about 12 parts of a filler material selected from the group consisting of graphite, mica, titanium dioxide and mixtures thereof; and about 0.25 to about 2 parts of a stabilizer selected from the group consisting of thio based antioxidants, hindered phenol antioxidants and mixtures thereof.

40. The method of claim 39 wherein said forming is selected from the group consisting of heating, extruding, curing and combinations comprising at least one of the foregoing methods.

41. The method of claim 39 wherein said disposing is selected from the group consisting of laminating, hot plate welding, and combinations comprising at least one of the foregoing methods.

42. The method of claim 39 further comprising disposing an adhesive on said article prior to disposing said intumescent elastomeric composition.

43. The method of claim 39 further comprising disposing a primer on said article prior to disposing said intumescent elastomeric thermoplastic composition.

44. The method of claim 39 wherein said disposing comprises disposing a solution or a suspension of the intumescent elastomeric composition and a solvent onto an article.

45. The method of claim 44 wherein said disposing is selected from the group consisting of dipping, spraying, thermal drying, chemical dessication, physical dessication, and combinations comprising at least one of the foregoing.

46. An intumescent elastomeric thermoplastic composition, comprising based on one hundred parts of said composition:

chlorinated polyethylene;

high-density polyethylene, wherein a ratio of said chlorinated polyethylene to said high-density polyethylene is greater than 4:1, and wherein a combined weight of said chlorinated polyethylene and said high-density polyethylene comprise about 40 to about 60 parts;

atom 5 to about 10 parts of a plasticizer;

about 10 to about 20 parts of a water emitting substance selected from the group consisting of hydrated alumina, hydrated magnesium oxide, magnesium hydroxide and mixtures thereof;

up to about 10 parts of at least one gas generating compound selected from the group consisting of ammonium dihydrogen phosphate, ammonium polyphosphate and mixtures thereof;

about 3 to about 10 parts of a char former selected from the group consisting of polyhydric alcohols, carbohydrates, starch and mixtures thereof;

about 1 to about 7 parts of antimony oxide;

about 2 to about 12 parts of a filler material selected from the group consisting of graphite, water intercalated graphite, mica, titanium dioxide and mixtures thereof; and about 0.25 to about 2 parts of a stabilizer selected from the group consisting of thio based antioxidants, hindered phenol antioxidants and mixtures thereof.

47. The composition of claim 46, wherein about 45 to about 55 parts is said chlorinated polyethylene.

48. The composition of claim 47, wherein about 5 to about 10 parts is said high-density polyethylene.

49. The composition of claim 48, wherein said graphite is a water intercalated graphite.

* * * * *